(12) United States Patent
Liu et al.

(10) Patent No.: US 8,887,666 B2
(45) Date of Patent: Nov. 18, 2014

(54) UNIVERSAL WATER FOUNTAIN SYSTEM FOR ANIMALS

(75) Inventors: Xinghua Liu, Shenzhen (CN); Marc E. Brush, Knoxville, TN (US); Ben T. Ferguson, III, Knoxville, TN (US); Jason R. Graves, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 586 days.

(21) Appl. No.: 13/180,662

(22) Filed: Jul. 12, 2011

(65) Prior Publication Data

US 2012/0180730 A1 Jul. 19, 2012

Related U.S. Application Data

(60) Provisional application No. 61/363,918, filed on Jul. 13, 2010.

(51) Int. Cl.
*A01K 7/02* (2006.01)
*B05B 17/08* (2006.01)

(52) U.S. Cl.
USPC ............................................. 119/74; 239/17

(58) Field of Classification Search
USPC .................................. 119/74, 72, 259; 239/17
See application file for complete search history.

(56) References Cited

U.S. PATENT DOCUMENTS

| | | | |
|---|---|---|---|
| 3,801,010 A * | 4/1974 | Hruby, Jr. ...................... 239/17 |
| 4,512,885 A | 4/1985 | Willinger |
| 4,688,720 A * | 8/1987 | MacDonald et al. ........... 239/17 |
| 4,842,727 A | 6/1989 | Willinger et al. |
| 4,872,611 A * | 10/1989 | Robinson et al. ............... 239/18 |
| 5,011,372 A * | 4/1991 | Nigrelli et al. ............. 415/211.2 |
| 5,052,343 A | 10/1991 | Sushelnitski |
| 5,799,609 A | 9/1998 | Burns et al. |
| 5,842,437 A | 12/1998 | Burns |
| 6,055,934 A | 5/2000 | Burns et al. |
| 6,257,497 B1 * | 7/2001 | Pham ............................. 239/17 |
| 6,257,560 B1 | 7/2001 | Kim |
| 6,279,835 B1 * | 8/2001 | Hansen .......................... 239/20 |
| 6,375,090 B1 | 4/2002 | Beidokhti |
| 6,450,122 B1 | 9/2002 | Frank |
| 6,460,483 B1 | 10/2002 | Northrop et al. |
| 6,526,916 B1 | 3/2003 | Perlsweig |
| 6,530,530 B1 * | 3/2003 | Peterson ........................ 239/17 |
| 6,622,657 B2 | 9/2003 | Northrop et al. |
| 6,755,349 B2 | 6/2004 | Beidokhti |
| 6,792,891 B1 | 9/2004 | Coburn et al. |
| 6,979,401 B1 | 12/2005 | Porter |
| 7,089,881 B2 | 8/2006 | Plante |
| 7,270,082 B2 | 9/2007 | Plante |
| 7,430,988 B2 | 10/2008 | Perlsweig et al. |
| 2002/0189548 A1 | 12/2002 | Northrop et al. |
| 2007/0095297 A1 | 5/2007 | Boyd |
| 2009/0241848 A1* | 10/2009 | Bryant ............................. 119/73 |
| 2010/0050950 A1 | 3/2010 | Graves et al. |

(Continued)

Primary Examiner — Yvonne Abbott
(74) Attorney, Agent, or Firm — Pitts & Lake, P.C.

(57) ABSTRACT

A submersible, universal water fountain system for an animal watering vessel. The system includes a port for discharging water into the vessel, a housing which has an inlet through which water is drawn from the vessel, and a pump for drawing water through the inlet and forcing the water from the housing through the port back into the vessel. The port discharges water in a pattern to diminish overspray outside the vessel and create a stream-like flow path of water movement in the vessel to enhance the water drinking experience of an animal.

33 Claims, 4 Drawing Sheets

(56) References Cited

U.S. PATENT DOCUMENTS

| | | | |
|---|---|---|---|
| 2011/0067638 A1* | 3/2011 | Lipscomb et al. | 119/74 |
| 2012/0216751 A1* | 8/2012 | Rowe | 119/72 |
| 2013/0180458 A1* | 7/2013 | Lipscomb et al. | 119/74 |
| 2013/0199454 A1* | 8/2013 | Lipscomb | 119/74 |
| 2013/0228132 A1* | 9/2013 | Lipscomb et al. | 119/74 |

* cited by examiner

UNIVERSAL WATER FOUNTAIN SYSTEM FOR ANIMALS

CROSS-REFERENCE TO RELATED APPLICATIONS

This Application claims the benefit of U.S. Provisional Application 61/363,918, filed on Jul. 13, 2010.

STATEMENT REGARDING FEDERALLY-SPONSORED RESEARCH OR DEVELOPMENT

Not Applicable

BACKGROUND OF THE INVENTION

1. Field of the Invention

This invention relates to animal watering devices, and more particularly, to animal watering devices that provide moving water for an animal to drink.

2. Description of the Related Art

Animals in the wild drink from various water sources, including sources with moving water and sources with stationary water. Given the choice, most animals prefer moving water and, whenever possible, clean, fresh, moving water. Animal caretakers have a desire for animal watering devices that deliver moving, filtered, clean water to an animal or plurality of animals, such as pets or zoo animals. Unfortunately, traditional water vessels do not provide circulation or filtration to the water, but, instead, only provide a containment vessel for stationary, unfiltered water. Accordingly, if an animal caretaker desires to provide moving, filtered clean water to an animal or plurality of animals, the animal caretaker must invest in a specialized watering vessel which does not allow the caretaker consumer to provide moving, filtered clean water from a vessel of their choice.

A submersible, universal water fountain system would offer great flexibility to animal caretakers, so they could provide an animal or plurality of animals with moving, filtered clean water in a variety of vessels. Such vessels might include specific bowls, trays, troughs or design-specific vessels, such as custom-shaped vessels designed to blend with the aesthetics of an animal exhibit at a zoo. The submersible, universal water fountain system would be relatively small compared to the volume of the vessel such that the submersible, universal water fountain does not interfere with an animal drinking from the reservoir of water within the vessel. Stated differently, the size of the submersible, universal water fountain system would be small enough to be able to fit into the vast majority of watering vessels, with the vessel serving as a water reservoir while the submersible, universal water fountain system would provide a source of movement for the water flow, and, optionally, filtration of the water.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A submersible universal water fountain system for animals is described herein and illustrated in the accompanying figures. The submersible, universal water fountain system comprises a housing defined to have at least one intake port for the intake of water into the system, a submersible pump for forcibly moving water into, through, and out of the system, and at least one exit port for the output of water from the system back into the reservoir of water contained within the vessel. In some embodiments, an optional filter is included. In some embodiments, the at least one exit port is rectilinear in shape to provide for directional, stream-like moving water flow back into the reservoir.

The submersible universal water fountain system is readily attachable and detachable from a vessel utilized for providing water for an animal. When residing in a reservoir of a filled vessel, or, alternatively, a vessel carrying water, the submersible universal water fountain system provides circulation to the water such that an animal may be more readily enticed to drink the moving water. The submersible universal water fountain system also may provide filtration for the vessel to remove unwanted contaminants from the water.

Figure 1:
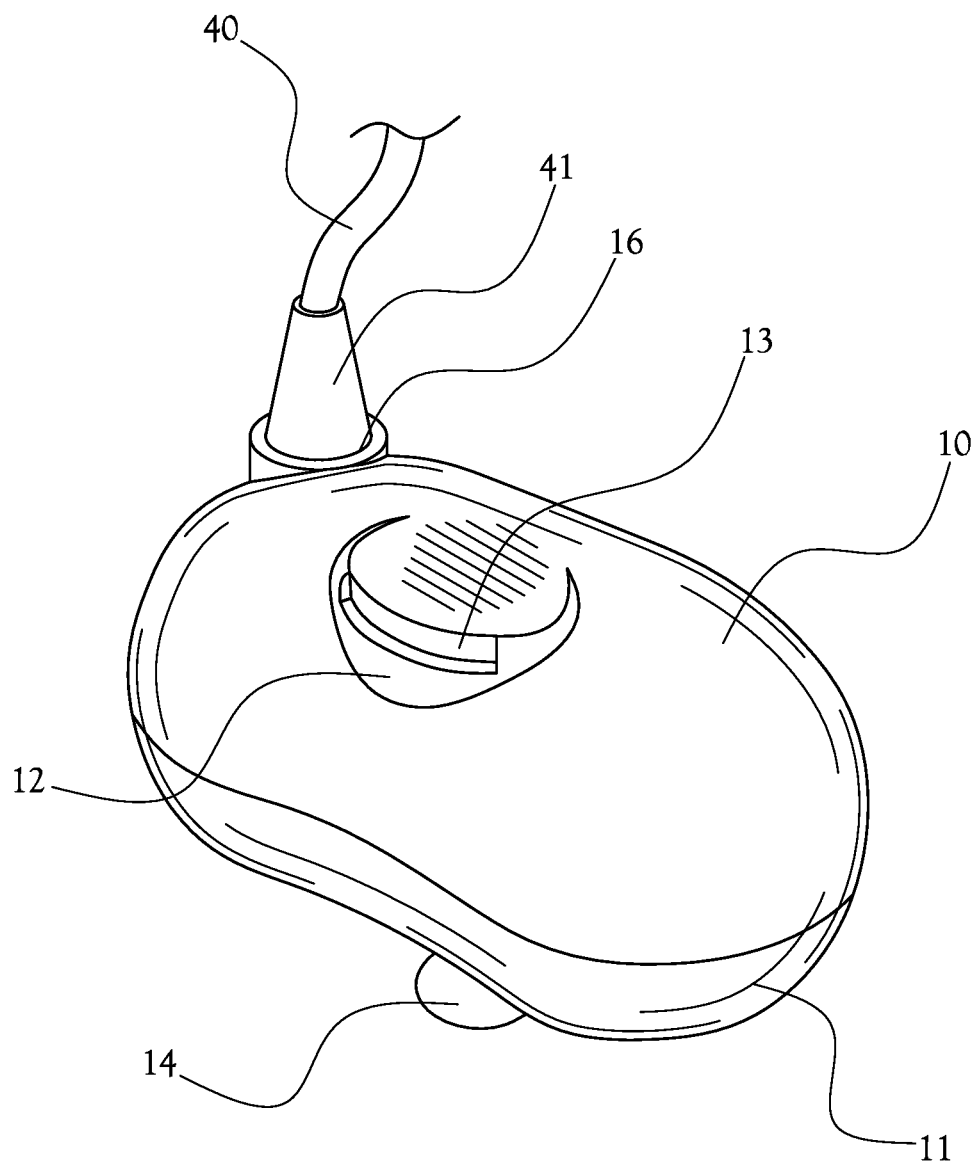
FIG. 1 is an illustration of one embodiment of the submersible universal water fountain system.

FIG. 1 is an illustration of one embodiment of the submersible universal water fountain system. This submersible universal water fountain system is utilized with any vessel that provides water for an animal to convert the vessel into one that provides filtered moving water. For example, the submersible universal water fountain system transforms any animal watering vessel or gravity water system into a filtered water fountain with stream-like water flow.

As illustrated in FIG. 1, the submersible universal water fountain system includes a housing comprised of an upper housing 10 and a lower housing 11. In some embodiments, upper housing 10 and lower housing 11 are configured to snap together (see FIG. 2, brackets 60 and recessed ledge 61, and FIG. 3, tabs 64 and tab 63). In the illustrated embodiment, upper housing 10 and lower housing 11 are configured in an overall curved shape, alternatively known as a "bean" or "kidney" shape, not only to better conform to the interior curvature of curved water vessels, thus maximizing access to the water reservoir by the animal, but also excluding sharp edges from the housing shape to avoid injury to the animal. In some embodiments, upper housing 10 and lower housing 11 are configured to snap together in sufficiently tight proximity such that pump 20 (see FIG. 2) creates a vacuum within the joined housing 10, 11 during operation. This allows the system to be able to continue to move and filter water even when the water level has dropped below the level of the intake (see FIG. 2, 24) of pump 20. In some embodiments, at least one removable fastener 14 is included on the lower housing 11 to facilitate attachment of the lower housing 11 to a water vessel. Fastener 14 is removable such that removal of lower housing 11 is easily facilitated. In some embodiments, fastener 14 is a suction cup. It should also be recognized that magnets, fasteners, or suction cups on the bottom of the lower housing 11 may be used without departing from the spirit and scope of the present invention.

FIG. 1 further illustrates upper housing 10 having wall 12 defined therein. In some embodiments, wall 12 is curved. Also defined within upper housing 10 and above wall 12 is port 13, through which water flows out from the interior of the system back into the vessel. In some embodiments, port 13 is rectilinearly shaped. In some embodiments, port 13 is rectilinearly arcuate in shape, to facilitate directional, stream-like, outflow of water from the system back into the vessel and water reservoir contained within the vessel. Upper housing 10 is designed to overlay port 13 such that only directional, stream-like, outflow of water is achieved, thus minimizing or, optimally, eliminating overspray of moving water outside the vessel. Additionally, so long as the water reservoir level is maintained sufficiently above port 13, the outflow of water is entirely submerged, thus creating a stream-like moving water flow beneath the reservoir surface. Alternatively, should the water reservoir level fall below port 13, the outflow of water will continue to be directional, thus overspray of moving water outside the vessel remains minimized.

Also illustrated in FIG. 1 is grommet port 16 defined in upper housing 10. Grommet 41 is structured so as to completely fill grommet port 16 in sufficiently tight proximity such that pump 20 creates a vacuum within the joined upper housing 10 and lower housing 11 during operation. Grommet 41 is defined to have an internal through opening through which cable 40 travels. Cable 40 connects submersible pump 20 (see FIG. 2) to an electrical plug 70 which remains outside the vessel. Grommet 41 provides cable relief and secures cable 40 of pump 20 within and between lower housing 11 and upper housing 10. In some embodiments, cable 40 includes a connector 72 (see FIG. 4) which provides a means of readily accessible disconnect for the power source to the system. In some embodiments, optional additions of fasteners 14 may be utilized to position cable 40 out of the access path to the water, thus creating a safer and more inviting and accessible water vessel from which animals may drink. It should also be recognized that a formable sleeve encompassing the exterior of cable 40, or a clip or clips placed along cable 40 may be used as fasteners 14 without departing from the spirit and scope of the present invention.

Figure 2:
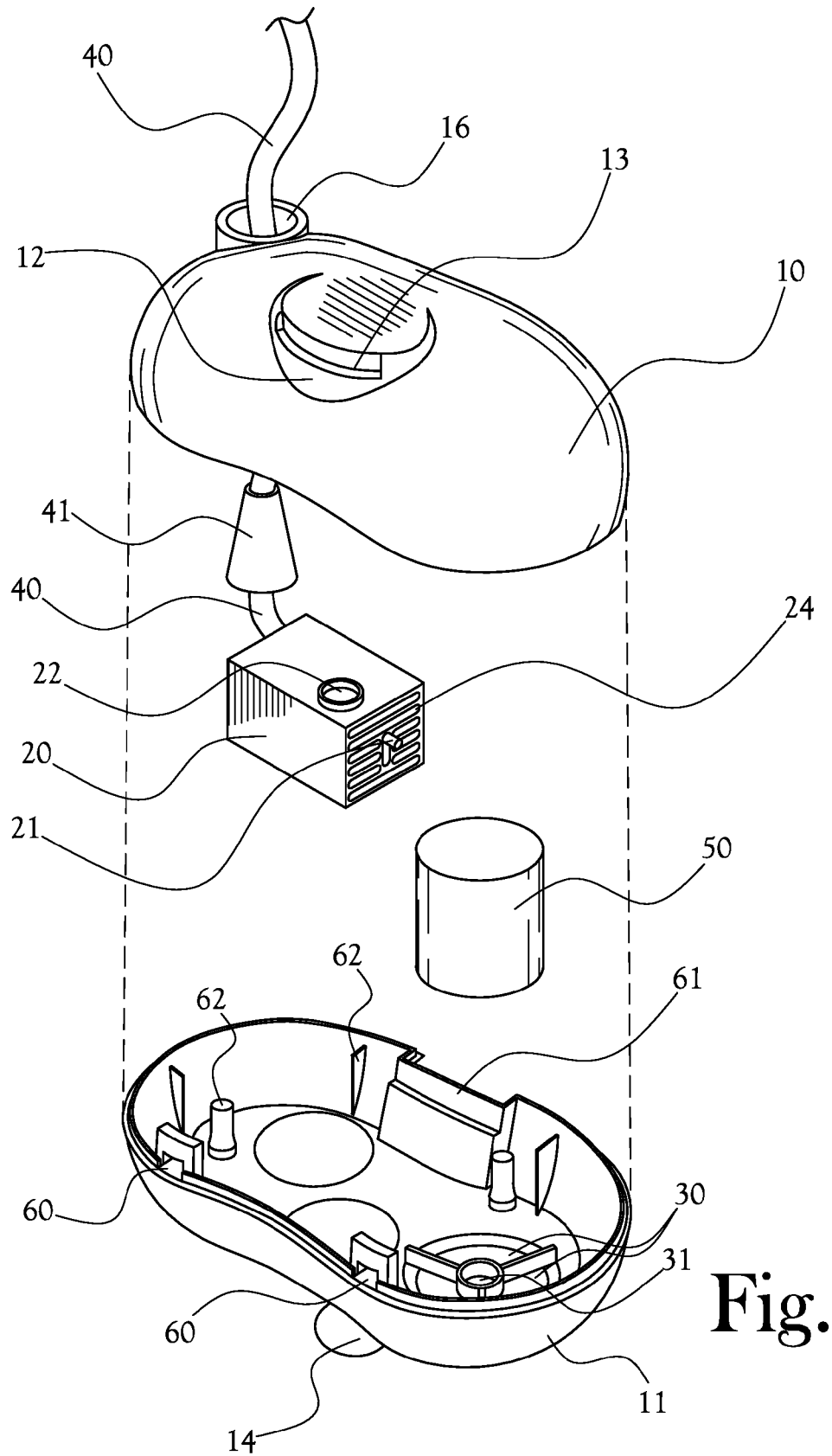
FIG. 2 is an exploded illustration of one embodiment of the submersible universal water fountain system.
Figure 3:
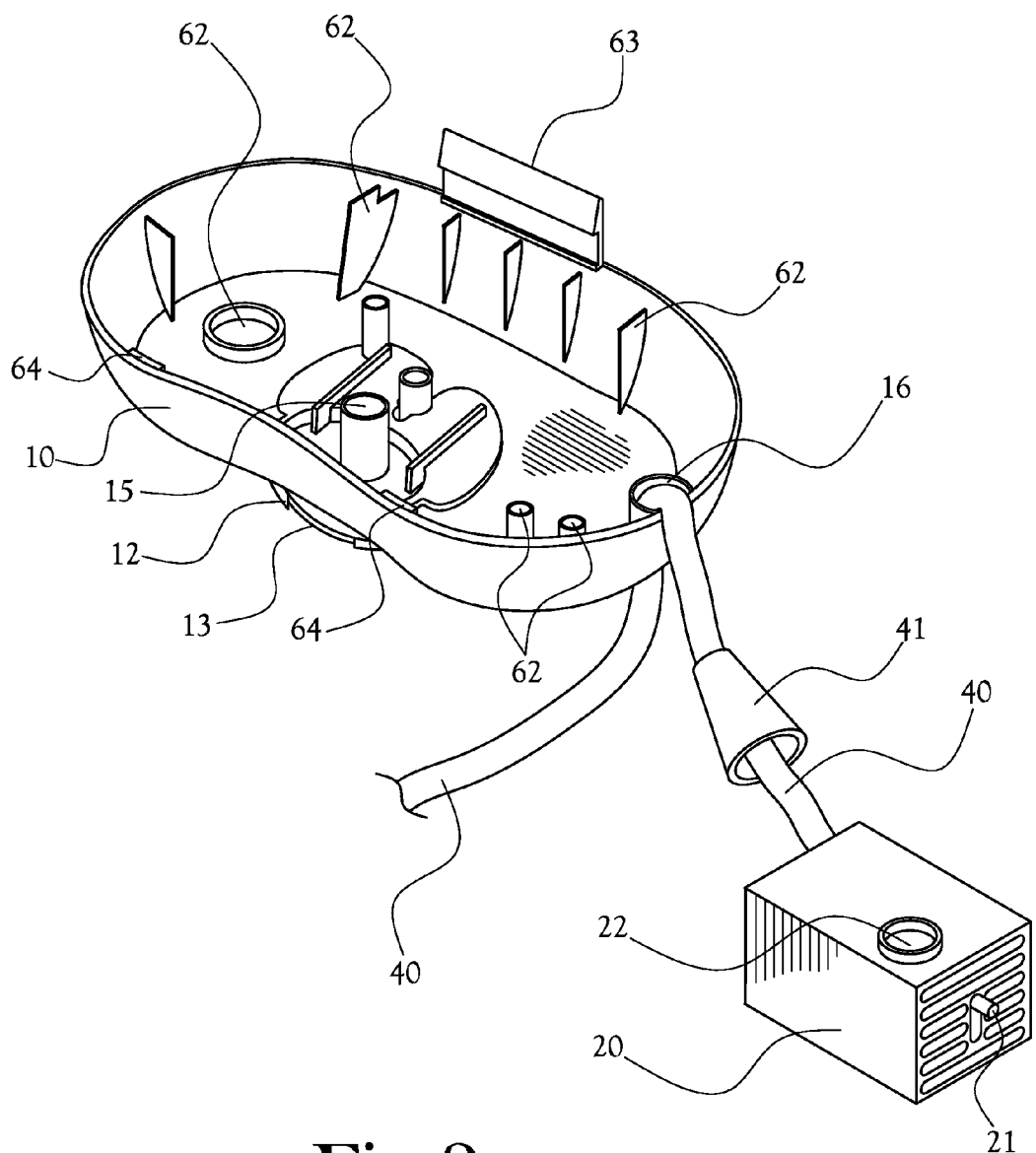
FIG. 3 is an illustration of an interior view of the upper housing for one embodiment of the submersible universal water fountain system.

In some embodiments, as FIG. 2 illustrates, lower housing 11 is shown, with at least one fastener 14, which serves to attach lower housing 11 to the bottom of a water vessel. Defined within the perimeter edge of lower housing 11 are at least one bracket 60 and a recessed edge 61 to facilitate attachment to upper housing 10 via complementary definitions within upper housing 10, respectively tab 64 and tab 63 as shown in FIG. 3. Structural support may be enhanced in some embodiments by inclusion of one or more optional protrusion(s) 62 which is defined into the interior surface of lower housing 11. Also defined into lower housing 11 are a series of intake ports including curved intake ports 30 which surround a central intake port 31. The composite intake ports 30 and central intake port 31 allow continuous water intake into the system from the reservoir contained within the vessel.

Further illustrated in FIG. 2 is upper housing 10 including wall 12, port 13, and grommet port 16 as defined therein. Grommet 41 is shown as pulled away from and through grommet port 16, to illustrate cable 40 connecting from pump 20 through grommet 41 through grommet port 16. Cable 40 connects submersible pump 20 to an electrical plug 70 which remains outside the water vessel. Defined into pump 20 is port 22 which serves to direct water flow from the pump 20 through port 22, through transfer port 15 such that the pumped water flows out through port 13 thus creating directional, stream-like water flow back into the water reservoir within the water vessel.

Also illustrated in FIG. 2 is optional filter 50. Filter 50 is adapted to receive contaminants, such as, for example, chlorine, organic compounds, heavy metals, debris, etc., in the reservoir that are received from intake port(s) 30 and central intake port 31. In some embodiments, filter 50 is adapted to be removably received within and between lower housing 11 and upper housing 10. More specifically, filter 50 is configured for placement adjacent to submersible pump 20 such that water directed from intake port(s) 30 and central intake port 31 is in fluid communication with filter 50. Moreover, filter 50 is selectable for the desired filtering properties of the system. For example, filter 50 may include an embodiment wherein filter 50 includes soft batting heat sealed to a plastic frame trapping carbon inside, or an embodiment wherein filter 50 includes a molded plastic housing containing carbon and or other filter media. Because filter 50 is removably received within and between lower housing 11 and upper housing 10, filter 50 is readily replaceable as desired.

Pump 20, shown in FIG. 2, features adjustment switch 21 whereby the water flow rate through pump 20 may be adjusted as desired. In some embodiments, pump 20 is configured to reside within and between lower housing 11 and upper housing 10 of the system such that submersible pump 20 draws water into lower housing 11 via intake port(s) 30 and central intake port 31. Stated differently, pump 20 must be in fluid communication with the water reservoir in the water vessel. In some embodiments, pump 20 may be secured to lower housing 11 via fasteners, such as, for example, fasteners similar to fastener 14 used to secure lower housing 11 onto an inner surface of the water vessel. The water thus drawn into lower housing 11 flows through optional filter 50 and into pump 20 via pump intake port(s) 24. Upon water flowing into pump 20 via pump intake port(s) 24, pump 20 then moves water forcibly out of pump 20 via exit port 22. Exit port 22 connects to transfer port 15, transfer port 15 being detachedly affixed to the interior of upper housing 10, as illustrated in FIG. 3.

FIG. 3 additionally illustrates the interior of upper housing 10. Pump 20 is fixedly attached to cable 40, with grommet 41 shown, for illustrative purposes, drawn outside of grommet port 16 where grommet 41 resides when the system is fully assembled. (See FIG. 1). Tab 63 in upper housing 10 correlates and attaches to recessed edge 61 of lower housing 11 whereby attachment and closure of one side edge of upper housing 10 and lower housing 11 is achieved. To attain attachment and closure of the other side edge of upper housing 10 to lower housing 11, at least one tab 64 in upper housing 10 inserts into at least one bracket 60 of lower housing 11, thus the combination of tabs 63 and 64, and recessed edge 61 and brackets 60, serve to attach the edges of upper housing 10 and lower housing 11 sufficiently to obtain tight closure and adequate seal between upper housing 10 and lower housing 11. Structural support may be enhanced in some embodiments by inclusion of one or more optional protrusion(s) 62 which is defined into the interior surface of upper housing 10.

In some embodiments, the interior diameter of exit port 22 is slightly larger than the exterior diameter of transfer port 15, thus facilitating close connectivity between the exit port 22 of pump 20 and the transfer port 15 of upper housing 10, whereby water efficiently flows between exit port 22 and transfer port 15. Transfer port 15 flows water directly against wall 12 of upper housing 10 and the interior surface of upper housing 10, whereby water must undergo a directional change of flow to exit via port 13. In some embodiments, port 13 is rectilinearly shaped. In some embodiments, port 13 is rectilinearly arcuate in shape, thus altering the exit path of pumped water to create a directional, stream-like, moving water flow. In some embodiments, port 13 is configured so as to produce a plurality of spaced-apart streams of water discharged therefrom. Water exits the system via port 13 and reenters the water reservoir of the vessel. So long as the level of water in the water reservoir is maintained sufficiently above port 13, the outflow of water is entirely submerged, thus creating a stream-like moving water flow beneath the reservoir surface. Alternatively, if the water level is maintained below port 13, the stream-like moving water flow occurs above the water surface and an aural enhancement, namely, the sound of running water, is produced. Additionally, the directional flow of water provided by port 13 reduces, minimizes, or, optimally, eliminates overspray of moving water outside the vessel. The efficiency of the overspray diminution or elimination is controlled, at least in part, by factors outside the scope of this invention, including, but not limited to, factors such as placement of the invention within the vessel, selection of water flow adjustment on adjustment switch 21, and level of water maintained within the water reservoir of the vessel.

Figure 4:
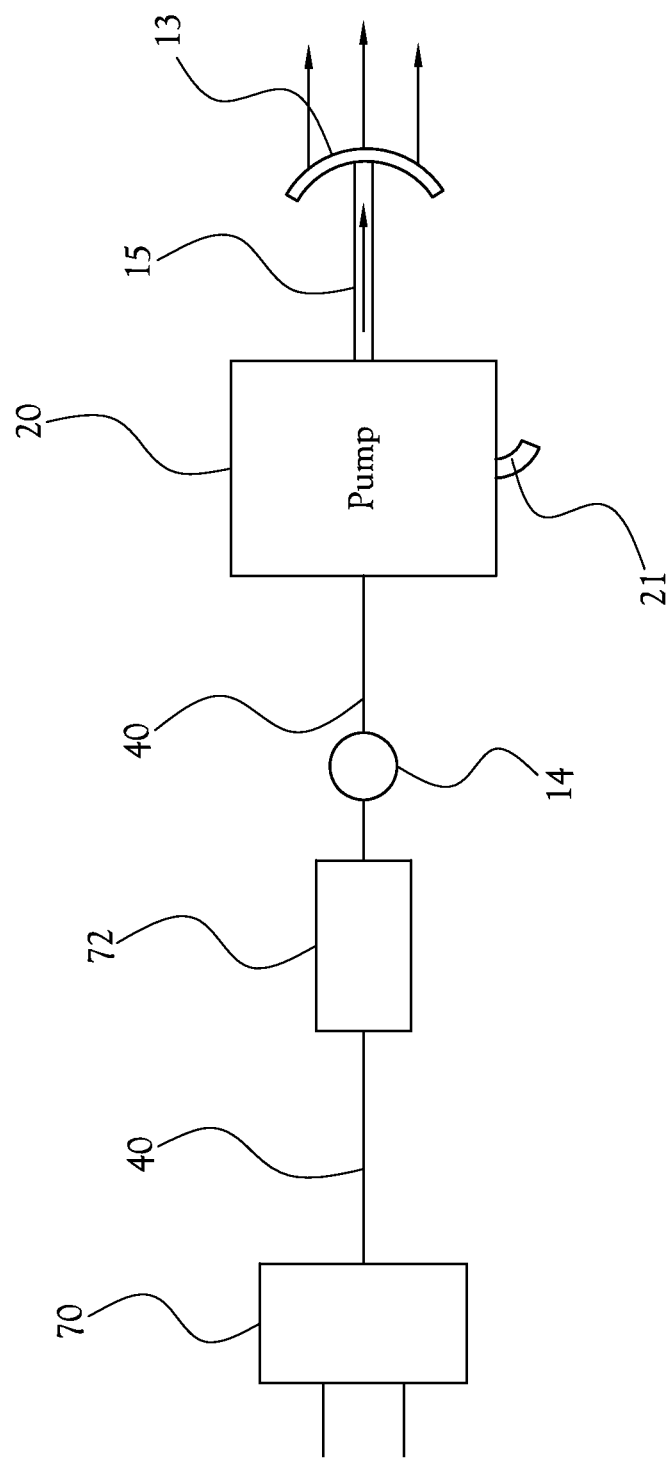
FIG. 4 is a diagram of the basic electronics for one embodiment of the submersible universal water fountain system.

FIG. 4 is a diagram of the power flow within the submersible, universal water fountain system, wherein plug 70 is placed into a power source and cable 40 emerges from plug 70 to provide power transfer along cable 40, through optional connector 72 to pump 20. Thus powered, pump 20, in turn, draws water through the system and out through transfer port 15 where the water exits the system via port 13. Optional connector 72 provides a means of readily accessible disconnect for the power source to the system. In some embodiments, optional additions of fasteners 14 may be utilized to position cable 40 out of the access path to the water, thus creating a safer and more inviting and accessible water vessel from which animals may drink. It should also be recognized that a formable sleeve encompassing the exterior of cable 40, or a clip or clips placed along cable 40 may be used as fasteners 14 without departing from the spirit and scope of the present invention.

It should also be noted that alternate embodiments of the submersible universal water fountain system can include other types of devices for enticing an animal to drink. For example, in one embodiment, the upper housing is lit by lights (e.g., LEDs) to entice or attract the animal and improve the appearance of the water system.

From the foregoing description, those skilled in the art will recognize that a submersible universal water fountain system is provided. The submersible universal water fountain system is readily attached and detached from a vessel utilized for providing water for an animal while allowing the animal caretaker to use the vessel of their choice or the preferred vessel of an animal. More specifically, the submersible universal water fountain system provides circulation and filtration to the water such that an animal may be more readily enticed to drink the filtered moving water. Furthermore, this invention allows the animal's caretaker to provide filtered, moving water at a much lower cost compared to other inventions which tend to be much larger and have an integrated water reservoir and drinking vessel. Additionally, this invention provides for minimized overspray of moving water outside a water vessel.

The invention claimed is:

1. A submersible, universal water fountain system for use in an animal watering vessel having an upper lip and fabricated for containing water therein, said system comprising:
   a housing defining an inlet through which water is drawn from said vessel and a port to discharge water drawn from said vessel, the housing being configured to be submersible below an upper surface of water contained in the animal watering vessel such that the port discharges the water drawn from said vessel in a substantially rectilinear flow path below the upper surface of water contained in said vessel; and
   a pump provided in said housing for drawing water through said inlet and forcing water from said housing through said port.

2. The submersible, universal water fountain system of claim 1 wherein said housing has a wall which defines said port therein.

3. The submersible, universal water fountain system of claim 1 wherein said port discharges water from said housing in a flow path having a substantially rectilinear cross-section to create a stream-like flow path of water movement in said vessel.

4. The submersible, universal water fountain system of claim 1, further comprising a filter provided in said housing to filter water as it passes from said inlet to said port prior to discharge into said vessel.

5. The submersible, universal water fountain system of claim 1 wherein said pump is adjustable such that water is discharged from said port at a desired flow rate.

6. The submersible, universal water fountain system of claim 1 wherein said port produces a stream of water discharged therefrom which is substantially rectilinear in cross-sectional outline.

7. The submersible, universal water fountain system of claim 1 wherein said port produces a plurality of spaced-apart streams of water discharged therefrom.

8. The submersible, universal water fountain system of claim 1 wherein said housing defines an overall "bean" shape.

9. The submersible, universal water fountain of claim 8, further comprising a filter provided in said housing to filter water as it passes from said inlet to said port prior to discharge into said vessel.

10. The submersible, universal water fountain system of claim 1 wherein said housing is sufficiently sealed so as to allow said pump to create a vacuum inside said housing, whereby allowing said system to continue to function until a point where the water level drops below said inlet of said housing, thus breaking said vacuum.

11. The submersible, universal water fountain of claim 10 wherein said housing has a wall which defines said port therein.

12. The submersible, universal water fountain of claim 10 wherein said port discharges water from said housing in a flow path having a substantially rectilinear cross-section to create a stream-like flow path of water movement in said vessel.

13. The submersible, universal water fountain of claim 10 wherein water is filtered and refreshed as it passes from said inlet to said port prior to discharge into said vessel.

14. The submersible, universal water fountain of claim 10 wherein said pump is adjustable such that water is discharged from said port at a desired flow rate.

15. The submersible, universal water fountain of claim 10 wherein said port produces a stream of water discharged therefrom which is substantially rectilinear in cross-sectional outline.

16. The submersible, universal water fountain of claim 10 wherein said port produces a plurality of spaced-apart streams of water discharged therefrom.

17. The submersible, universal water fountain system of claim 10 wherein said housing defines an overall "bean" shape.

18. A submersible, universal water fountain system for use in an animal watering vessel having an upper lip and fabricated for containing a selected level of water therein, said water defining an upper surface below the vessel lip, said system comprising:

a port for discharging water into said vessel below said upper lip;

a housing defining an inlet through which water is drawn from said vessel; and a pump for drawing water through said inlet and forcing water from said housing through said port;

wherein said port discharges water from said housing in a flow path having a substantially rectilinear cross-section to create a stream-like flow path of water movement in said vessel to enhance the water drinking experience of an animal and to diminish overspray of water outside the confines of said vessel.

19. The submersible, universal water fountain system of claim 18 wherein said housing has a wall which defines said port therein.

20. The submersible, universal water fountain system of claim 18, further comprising a filter provided in said housing to filter water as it passes from said inlet to said port prior to discharge into said vessel.

21. The submersible, universal water fountain system of claim 18 wherein said pump is adjustable such that water is discharged from said port at a desired flow rate.

22. The submersible, universal water fountain system of claim 18 wherein said port produces a stream of water discharged therefrom which is substantially rectilinear in cross-sectional outline.

23. The submersible, universal water fountain system of claim 18 wherein said port produces a plurality of spaced-apart streams of water discharged therefrom.

24. The submersible, universal water fountain system of claim 18 wherein said housing defines an overall "bean" shape.

25. The submersible, universal water fountain of claim 24, further comprising a filter provided in said housing to filter water as it passes from said inlet to said port prior to discharge into said vessel.

26. The submersible, universal water fountain system of claim 18 wherein said housing is sufficiently sealed so as to allow said pump to create a vacuum inside said housing, whereby allowing said system to continue to function until a point where the water level drops below said inlet of said housing, thus breaking said vacuum.

27. A submersible water movement system for use in an animal watering vessel, the animal watering vessel being configured to contain an unmoving reservoir of water, the submersible water movement system converting the vessel into one that provides moving water, said system comprising:

a housing configured to be submersible in a reservoir of water of the animal watering vessel;

at least one port formed in the housing and configured to discharge water in a flow path below an upper surface of the reservoir of water such that the flow path creates a stream-like water flow beneath the upper surface of the reservoir of water;

at least one inlet formed in the housing through which water is drawn from said vessel; and a pump provided in said housing for drawing water through said inlet and forcing water through said port.

28. The system of claim 27, wherein the housing is configured to be readily attachable/detachable to the animal watering vessel.

29. The system of claim 27, wherein the at least one port is provided below an upper surface of the housing.

30. The system of claim 27, wherein the port is rectilinearly arcuate in shape to create a substantially rectilinear flow path below the upper surface of the reservoir of water.

31. The system of claim 27, wherein the an upper surface and a lower surface of the housing are configured in an overall curved shape.

32. The system of claim 31, wherein the overall curved shape is a bean shape.

33. A submersible water movement system for use in an animal watering vessel, the animal watering vessel being configured to contain an unmoving reservoir of water, the submersible water movement system converting the vessel into one that provides moving water, said system comprising:

a housing configured to be submersible in a reservoir of water of the animal watering vessel;

at least one port formed in the housing and configured to discharge water;

at least one inlet formed in the housing through which water is drawn from said vessel; and a pump provided in said housing for drawing water through said inlet and forcing water through said port;

wherein the housing is sufficiently sealed so as to allow said pump to create a vacuum inside said housing.

* * * * *